United States Patent Office 3,377,365
Patented Apr. 9, 1968

3,377,365
(OPTIONALLY 17-ALKYLATED) 11β,13β-DIAL-
KYLGONA - 1,3,5(10) - TRIENE - 3,17β-DIOLS,
ETHERS AND ESTERS THEREOF
John S. Baran, Morton Grove, Ill., assignor to
G. D. Searle & Co., Chicago, Ill., a corporation of Delaware
No Drawing. Continuation-in-part of application Ser. No.
512,539, Dec. 8, 1965. This application Mar. 14, 1967,
Ser. No. 622,932
Claims priority, application Great Britain, Oct. 12, 1966,
45,594/66
7 Claims. (Cl. 260—397.5)

ABSTRACT OF THE DISCLOSURE (Optionally 17 - alkylated 11β,13β - dialkylgona - 1,3,5 (10)-triene-3,17β-diols, ethers and esters thereof useful as pharmacological agents, e.g., as potent estrogens, and manufactured by reduction of the 17-keto and $\Delta^{9(11)}$ moieties of the corresponding 3-oxygenated 11-alkylgona-1,3,5(10) - tetraen - 17 - ones followed by oxidation of the resulting 17-hydroxy substances to regenerate the 17-keto group, addition of an organometallic reagent to the 17-keto group to afford the 17α-alkyl-17-hydroxy derivatives and acylation of the free hydroxy groups to yield the instant esters.

---

This application is a continuation-in-part of my copending application Ser. No. 512,539, filed Dec. 8, 1965, now U.S. Patent 3,325,520.

The present invention relates to novel steroidal chemical compounds characterized by an estratriene ring structure and by an 11-alkyl substituent. These compounds are, more particularly, described as (optionally 17-alkylated 11β,13β - dialkylgona - 1,3,5(10) - triene - 3,17β-diols, ethers and esters thereof and are represented pictorially by the following structural formula

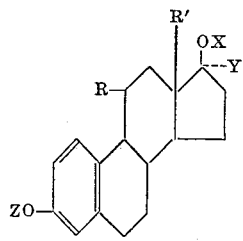

wherein R and R' are lower alkyl radicals, X is hydrogen or a lower alkanoyl radical, Y denotes hydrogen or a lower alkyl radical and Z is hydrogen or a lower alkyl or a lower alkanoyl radical.

The instant compounds are useful as a result of their valuable pharmacological properties. They are potent estrogens, for example, especially so when administered by the oral route.

The novel compounds of this invention are conveniently produced from starting materials represented by the following structural formula

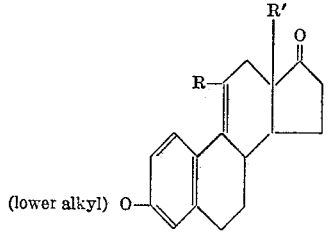

wherein R and R' are as hereinbefore defined. Those materials together with methods for their manufacture are described in my copending application Ser. No. 512,539, filed Dec. 8, 1965. Reaction of those starting materials with a metallic reducing agent results in selective reduction of the 17-keto function to produce the corresponding 17-hydroxy compounds. As a specific example, 3-methoxy-11-methylestra-1,3,5(10),9(11)-tetraen-17-one in tetrahydrofuran is contacted with lithium tri-(tertiary-butoxy) aluminum hydride, thus affording 3-methoxy-11-methyl-estra-1,3,5(10),9(11)-tetraen-17β-ol. Reduction of the 9(11) double bond is conveniently effected by reaction of the latter substances with hydrogen in the presence of a suitable hydrogenation catalyst. The aforementioned 3-methoxy-11-methylestra-1,3,5(10),9(11)-tetraen-17β-ol is thus shaken with hydrogen in the presence of 10% palladium-on-carbon catalyst to yield 3-methoxy-11β-methyl-estra-1,3,5(10)-trien-17β-ol. An alternate route to the latter substances involves initial hydrogenation of the 9(11) double bond and subsequent reduction of the 17-keto group. The aforementioned 3-methoxy-11-methyles-tra-1,3,5(10),9(11)-tetraen-17-one is thus hydrogenated to afford 3-methoxy-11β-methylestra-1,3,5(10)-trien-17-one, which is reduced to yield 3-methoxy-11β-methylestra-1,3,5(10)-trien-17β-ol.

The 17-alkyl derivatives of this invention are obtained by allowing the corresponding 3-alkoxy-11β,13β-dialkyl-gona-1,3,5(10)-trien-17-ones, obtained by reduction, suitably by catalytic hydrogenation with palladium, of the coresponding 1,3,5(10),9(11)-tetraenes, to react with an alkyl organometallic reagent. Thus, for example, 3-methoxy-11β-methylestra-1,3,5(10)-trien-17-one in tetrahydrofuran is contacted with ethereal methyl magnesium bromide, and the Grignard adduct is hydrolyzed, using aqueous sodium potassium tartrate, to afford 3-methoxy-11β,17α-dimethylestra-1,3,5(10)-trien-17β-ol.

An alternate method for manufacture of those 17-alkyl compounds wherein the alkyl group contains more than one carbon atom involves reaction of the corresponding 17-keto substances within an alkynyl organometallic reagent and subsequent hydrogenation of the 17-alkynyl substances to yield the appropriate 17-alkyl compound. The aforementioned 3 - methoxy - 11β - methylestra - 1,3, 5(10)-trien-17-one is thus allowed to react with a 30% lithium acetylide-70% ethylene diamine complex in tetrahydrofuran to produce 17α-ethynyl-3-methoxy-11β-methylestra-1,3,5(10)-trien-17β-ol. Hydrogenation at atmospheric pressure and room temperature, using 5% palladium-on-carbon catalyst affords 17α-ethyl-3-methoxy-11β-methylestra-1,3,5(10)-trien-17β-ol.

The 3-hydroxy compounds of this invention are preferably produced by cleavage of the corresponding 3-ethers. A particularly suitable process utilizes as the starting material 3-benzyloxy-11-methylestra-1,3,5(10),9(11)-tet-raen-17-one, the manufacture of which is described in my copending application Ser. No. 608,729, filed Jan. 12, 1967, now U.S. Patent 3,346,602. Reduction of the 17-keto group is effected by diisobutyl aluminum hydride in toluene to produce 11-methylestra-1,3,5(10),9(11)-tet-raene-3-17β-diol 3-benzyl ether. Catalytic hydrogenation of the 9(11) double bond, using 11% palladium-on-carbon catalyst, is accompanied by hydrogenolysis of the benzyl group, thus producing the desired 11β-methylestra-1,3,5(10)-triene-3,17β-diol.

The instant (lower alkanoyl)oxy derivatives are produced by acylation of the corresponding hydroxy substances with a lower alkanoic acid anhydride or halide, preferably in the presence of a suitable acid acceptor. 11β-methylestra-1,3,5(10)-triene - 3,17β - diol, when contacted with acetic anhydride in pyridine affords 11β-methylestra - 1,3,5(10) - triene - 3,17β - diol 3,17 - diacetate.

The instant compounds wherein the 13β-alkyl group contains more than one carbon atom are obtained as dl mixtures. Resolution of these dl compounds to afford the individual d and l enantiomorphs is conveniently effected by esterification of the hydroxy group with a dibasic acid anhydride such as succinic or phthalic anhydride to afford the corresponding acid ester, which is resolved by means of an optically active amine such as brucine, morphine, quinine, quinidine, strychnine, etc.

The inventoin will appear more fully from the examples which follow. These examples are given by way of illustration only and are not to be construed as limiting the invention either in spirit or in scope as many modifications both in materials and methods will be apparent from this disclosure to those skilled in the art. In these examples temperatures are given in degrees centigrade (° C.) and quantities of materials in parts by weight unless otherwise noted.

Example 1

A solution of 3 parts of 3-methoxy-11-methylestra-1,3,5(10),9(11)-tetraen-17-one and 9 parts of lithium tri-(tertiary-butoxy) aluminum hydride in 113 parts of tetrahydrofuran is stirred at room temperature for about 2 hours, then is poured into a mixture consisting of 70 parts by volume of 50% aqueous acetic acid and 30 parts of ice. Extraction of that aqueous mixture with chloroform affords an organic solution, which is washed successively with aqueous sodium sulfate and aqueous sodium bicarbonate, then is dried over anhydrous magnesium sulfate and distilled to dryness under reduced pressure to afford, as a viscous oil, 3-methoxy-11-methylestra-1,3,5(10),9(11)-tetraen-17β-ol, characterized by infrared absorption maxima, in chloroform, at about 2.78, 2.90, 6.22 and 6.38 microns.

To a solution of 2.5 parts of 3-methoxy-11-methylestra-1,3,5(10),9(11)-tetraen-17β-ol in 240 parts of methanol is added 0.3 part of 10% palladium-on-carbon catalyst, and the resulting reaction mixture is shaken with hydrogen at atmospheric pressure and room temperature until one molecular equivalent of hydrogen has been absorbed. The catalyst is removed by filtration, and the filtrate is concentrated to dryness under reduced pressure. After standing at room temperature for approximately 48 hours, the initial oily residue becomes crystalline. That material is purified by recrystallization from ether-hexane to afford 3 - methoxy - 11β - methylestra - 1,3,5(10) - trien - 17β-ol, melting at about 103–105°. In potassium bromide this compound exhibits infrared absorption maxima at about 3.00, 6.21, 6.35 and 6.65 microns. It displays also ultraviolet absorption peaks at about 278 and 287 millimicrons with molecular extinction coefficients of about 1800 and 1650, respectively, and is represented by the following structural formula

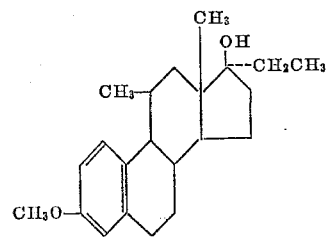

Example 2

To a solution of 5 parts of 3-methoxy-11-methylestra-1,3,5(10),9(11)-tetraen-17-one in 200 parts of methanol is added 0.5 part of 10% palladium-on-carbon catalyst, and that mixture is shaken with hydrogen at atmospheric pressure and room temperature until one molecular equivalent of hydrogen is absorbed. The reaction mixture is then filtered in order to remove the catalyst, and the filtrate is concentrated to a small volume by distillation under reduced pressure. The crystalline material which separates is collected by filtration and dried to afford 3-methoxy-11β-methylestra-1,3,5(10)-trien-17-one, melting at about 150°, and characterized further by ultraviolet absorption maxima at about 279–280 and 288 millimicrons with molecular extinction coefficients of about 2,055 and 1,940, respectively. It exhibits also nuclear magnetic resonance peaks at about 50, 57, 61 and 224 cycles per second.

A mixture of 4 parts of 3-methoxy-11β-methylestra-1,3,5(10)-trien-17-one, 10 parts of a 30% lithium acetylide-70% ethylene diamine complex and 225 parts of tetrahydrofuran is stirred in a nitrogen atmosphere at about 0–5° for about 2½ hours, then is diluted carefully with water. The resulting solution is concentrated to a small volume under nitrogen, and the residual mixture is extracted with benzene. The benzene layer is dried over anhydrous magnesium sulfate, then is distilled to dryness under reduced pressure. Trituration of the resulting residue with ether and hexane followed by recrystallization from acetone-hexane affords 17α-ethynyl-3-methoxy-11β-methylestra-1,3,5(10)-trien-17β-ol, melting at about 169–171°. This compound exhibits infrared absorption maxima at about 2.87 and 3.07 microns.

To a solution of 3.4 parts of 17α-ethynyl-3-methoxy-11β-methylestra-1,3,5(10)-trien-17β-ol in 400 parts of methanol is added 0.5 part of 5% palladium-on-carbon catalyst, and that mixture is shaken with hydrogen at atmospheric pressure and room temperature until 2 molecular equivalents of hydrogen have been absorbed. Removal of the catalyst from the mixture by filtration affords an organic solution, which is concentrated to dryness by distillation under reduced pressure. The resulting residue is triturated with methanol to afford the crystalline crude product. Recrystallization from ether-hexane affords pure 17α-ethyl-3-methoxy-11β-methylestra-1,3,5(10)-trien-17β-ol, melting at about 121–123°. It is represented by the following structural formula

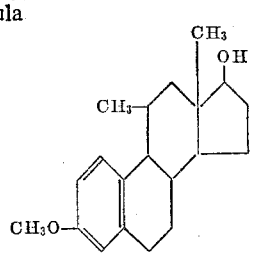

Example 3

To a solution of 5 parts of 3-methoxy-11-methylestra-1,3,5(10),9(11)-tetraen-17-one in 200 parts of methanol is added 0.5 part of 10% palladium-on-carbon catalyst, and that mixture is shaken with hydrogen at atmospheric pressure and room temperature until 1 molecular equivalent of hydrogen is absorbed. The reaction mixture is then filtered in order to remove the catalyst, and the filtrate is concentrated to a small volume by distillation under reduced pressure. The crystalline material which separates is collected by filtration and dried to afford 3-methoxy-11β-methylestra - 1,3,5(10)-trien-17-one, melting at about 150° and characterized further by ultraviolet absorption maxima at about 279–280 and 288 millimicrons with molecular extinction coefficients of about 2,055 and 1,940, respectively. It exhibits also nuclear magnetic resonance peaks at about 50, 57, 61 and 224 cycles per second.

To a solution of 15 parts by volume of ethereal 3 M methyl magnesium bromide in 63 parts of tetrahydrofuran is added, at the reflux temperature over a period of about 40 minutes, a solution of 1 part of 3-methoxy-11β-methylestra-1,3,5(10)-trien-17-one in 45 parts of tetrahydrofuran. The resulting reaction mixture is heated at the reflux temperature for about 4 hours, and the excess reagent is then destroyed by the careful addition of methanol to the mixture which has been cooled to 0–5°. That solution is shaken with aqueous sodium potassium tartrate, and the aqueous layer is separated and extracted with methylene chloride. The organic solutions are combined, dried over anhydrous magnesium sulfate and concentrated to dryness under reduced pressure. Purification of the residue by adsorption on a silica gel chromatographic column followed by elution with 5% ethyl acetate in benzene affords 3-methoxy - 11β,17α - dimethylestra-1,3,5(10)-trien-17β-ol, melting at about 95–108°. It is represented by the following structural formula

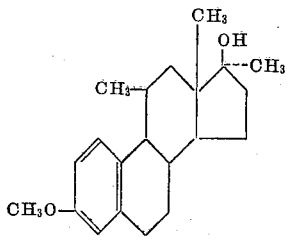

Example 4

To a solution of 3 parts of 3-benzyloxy-11-methylestra-1,3,5(10),9(11)-tetraen-17-one in 87 parts of toluene is added a slight excess of 25% diisobutyl aluminum hydride in toluene. The resulting reaction mixture is stirred at room temperature for about 5 minutes, at the end of which time a small quantity of methanol is added in order to destroy the excess reagent. To the reaction mixture there is then added approximately 260 parts of toluene, and that mixture is stirred with ice water containing 31.5 parts of acetic acid. The two-phase system is separated and the organic layer is washed successively with dilute acetic acid, water, dilute aqueous sodium bicarbonate and water. Drying of that washed solution over anhydrous sodium sulfate followed by distillation of the solvent under reduced pressure affords 3-benzyloxy-11-methylestra-1,3,5(10),9(11)-tetraen-17β-ol as an oil.

A solution of 3.2 parts of 3-benzyloxy-11-methylestra-1,3,5(10),9(11)-tetraen-17β-ol in 192 parts of methanol together with 0.6 part of 10% palladium-on-carbon catalyst is shaken with hydrogen at atmospheric pressure and room temperature until two molecular equivalents of hydrogen has been absorbed. The catalyst is then removed by filtration and filtrate is concentrated to a small volume in order to induce crystallization. The crystalline product which separates is isolated by filtration and dried to afford 11β-methylestra - 1,3,5(10) - triene - 3,17β-diol, melting at about 223–225°. This compound is represented by the following structural formula

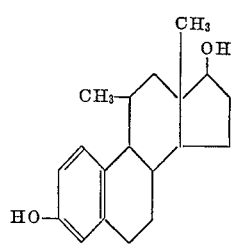

Example 5

When an equivalent quantity of 11-ethyl-3-methoxyestra-1,3,5(10),9(11)-tetraen-17-one is substituted as the starting material in the processes described in Example 1, there are produced 11-ethyl-3-methoxyestra-1,3,5(10),9(11) - tetraen - 17β - ol and 11β-ethyl - 3 - methoxyestra-1,3,5(10)-trien-17β-ol.

Example 6

The substitution of an equivalent quantity of dl-13-β-ethyl-3-methoxy-11-methylgona-1,3,5(10),9(11) - tetraen-17-one as the starting material in the procedure described in Example 1 results in dl-13β-ethyl-3-methoxy-11β-methylgona-1,3,5(10)-trien - 17 - one and dl-13β-ethyl-3-methoxy-11β-methylgona-1,3,5(10)-trien-17β-ol.

Example 7

A mixture of 2 parts of 3-methoxy-11β-methylestra-1,3,5(10)-trien-17β-ol, 20 parts of acetic anhydride and 40 parts of pyridine is allowed to stand at room temperature for about 16 hours, then is cooled and poured carefully into water. The resulting aqueous mixture is extracted with benzene, and the organic layer is separated, washed with water, dried over anhydrous sodium sulfate and stripped of solvent under reduced pressure to afford 3 - methoxy - 11β - methylestra-1,3,5(10)-trien-17β-ol 17-acetate.

Example 8

By substituting an equivalent quantity of propionic anhydride and otherwise proceeding according to the process described in Example 7, there is produced 3-methoxy-11β-methylestra-1,3,5(10)-trien-17β-ol 17 - propionate.

Example 9

By substituting an equivalent quantity of 3-ethoxy-11-methylestra-1,3,5(10),9(11)-tetraen-17-one and otherwise proceeding according to the processes described in Example 1, there are produced 3-ethoxy-11-methylestra-1,3,5(10),9(11)-tetraen-17β-ol and 3-ethoxy-11β-methylestra-1,3,5(10)-trien-17β-ol.

Example 10

When an equivalent quantity of 11β-methylestra-1,3,5(10)-trien-3,17β-diol is substituted in the procedure of Example 7, there is produced 11β-methylestra-1,3,5(10)-triene-3,17β-diol 3,17-diacetate.

Example 11

When an equivalent quantity of 11β,17α-dimethylestra-1,3,5(10)-triene-3,17β-diol is acrylated with acetic anhydride according to the procedure described in Example 7, there is produced 11β,17α-dimethylestra-1,3,5(10)-triene-3,17β-diol 3-acetate.

Example 12

The reaction of equivalent quantities of 11β-methylestra-1,3,5(10)-triene-3,17β-diol and propionic anhydride according to the procedure described in Example 7 results in 11β-methylestra-1,3,5(10)-triene-3,17β-diol 3,17 dipropionate.

What is claimed is:

1. A compound of the formula

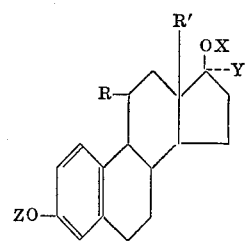

wherein R and R' are lower alkyl radicals, X is hydrogen or lower alkanoyl radicals, Y represents hydrogen or a lower alkyl radical, and Z is hydrogen or a lower alkyl, or a lower alkanoyl radical.

2. As in claim 1, a compound of the formula

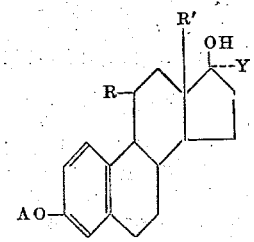

wherein R and R' are lower alkyl radicals, A is hydrogen or a lower alkyl radical and Y represents hydrogen or a lower alkyl radical.

3. As in claim 1, a compound of the formula

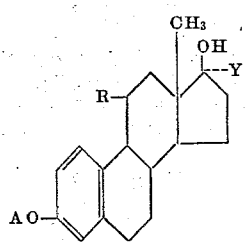

wherein R is a lower alkyl radical and A and Y represent hydrogen or a lower alkyl radical.

4. As in claim 1, the compound of the formula

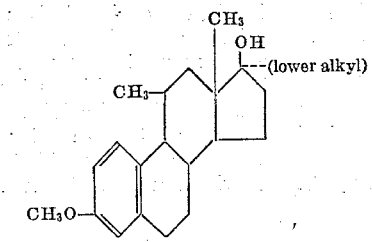

5. As in claim 1, the compound which is 11β-methyl-estra-1,3,5(10)-triene-3,17β-diol 3-methyl ether.

6. As in claim 1, the compound which is 17α-ethyl-11β-methylestra-1,3,5(10)-triene - 3,17β - diol 3-methyl ether.

7. As in claim 1, the compound which is 11β-methyl-estra-1,3,5(10)-triene-3,17β-diol.

References Cited

UNITED STATES PATENTS

| | | | |
|---|---|---|---|
| 3,159,543 | 12/1964 | Ercoli | 167—74 |
| 3,299,108 | 1/1967 | Baran | 260—397.5 |

OTHER REFERENCES

Wettstein: Helv. Chim. Acta, 22, 250 (1939).

LEWIS GOTTS, *Primary Examiner.*

T. M. MESHBESHER, *Assistant Examiner.*